Figure 1:
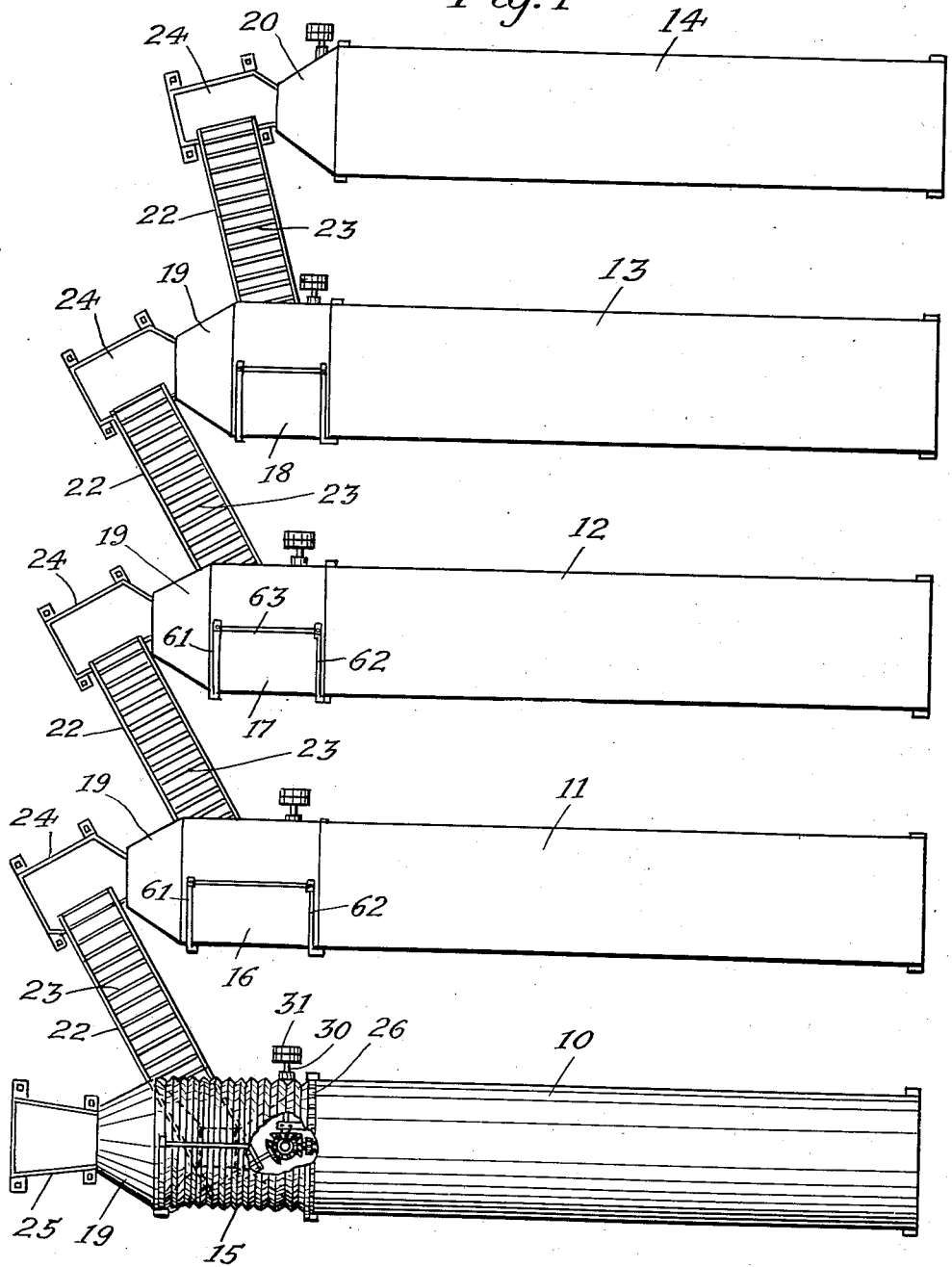

E. J. VAUDREUIL.
MACHINE FOR PREPARING VEGETABLES.
APPLICATION FILED AUG. 30, 1917.

1,304,719.

Patented May 27, 1919.

Inventor:
Edward J. Vaudreuil.
By his Attorney

E. J. VAUDREUIL.
MACHINE FOR PREPARING VEGETABLES.
APPLICATION FILED AUG. 30, 1917.
1,304,719.
Patented May 27, 1919.
4 SHEETS—SHEET 2.
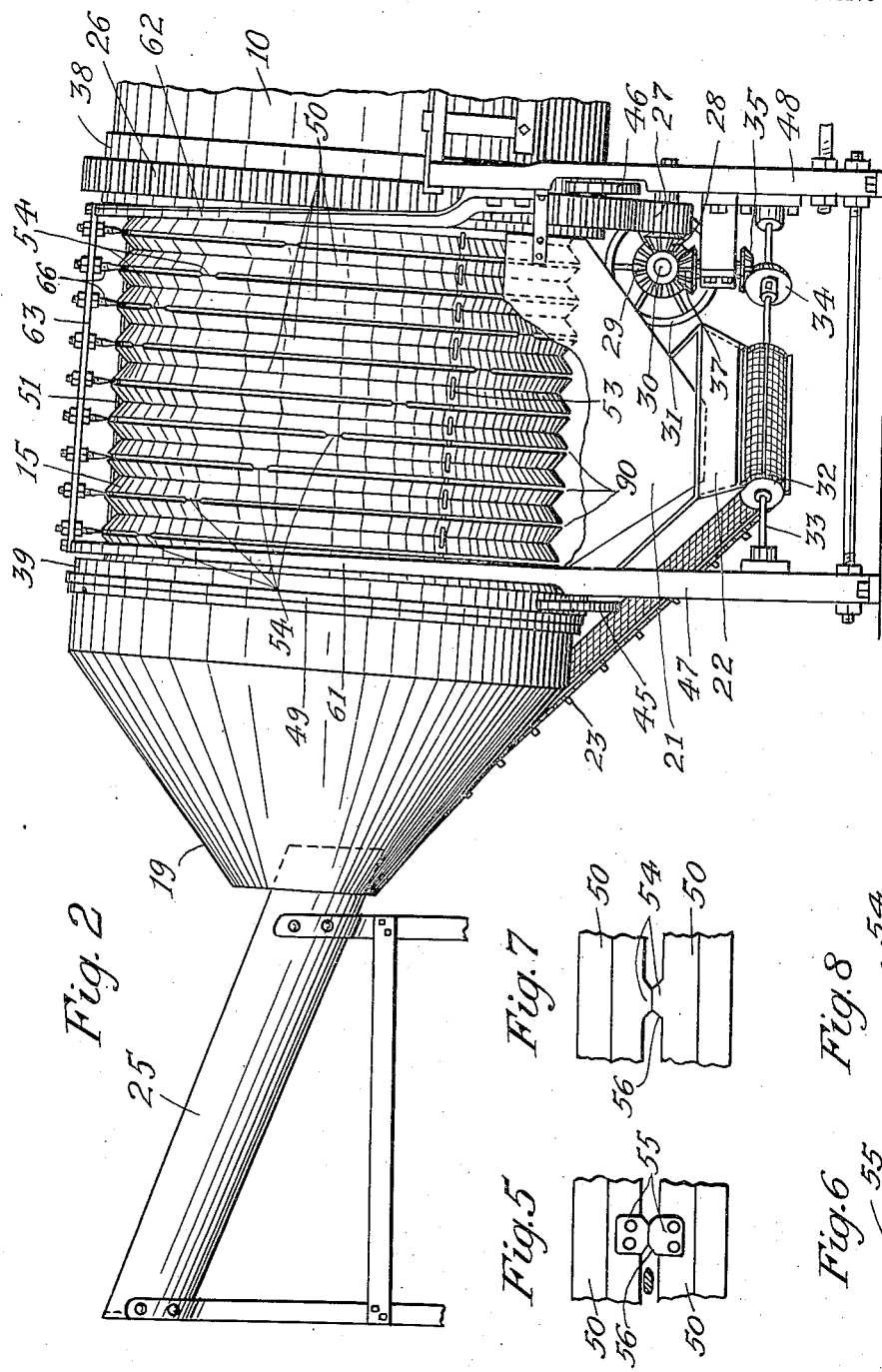

E. J. VAUDREUIL.
MACHINE FOR PREPARING VEGETABLES.
APPLICATION FILED AUG. 30, 1917.

1,304,719.

Patented May 27, 1919.

Inventor:
Edward J. Vaudreuil.
By [signature]
his Attorney.

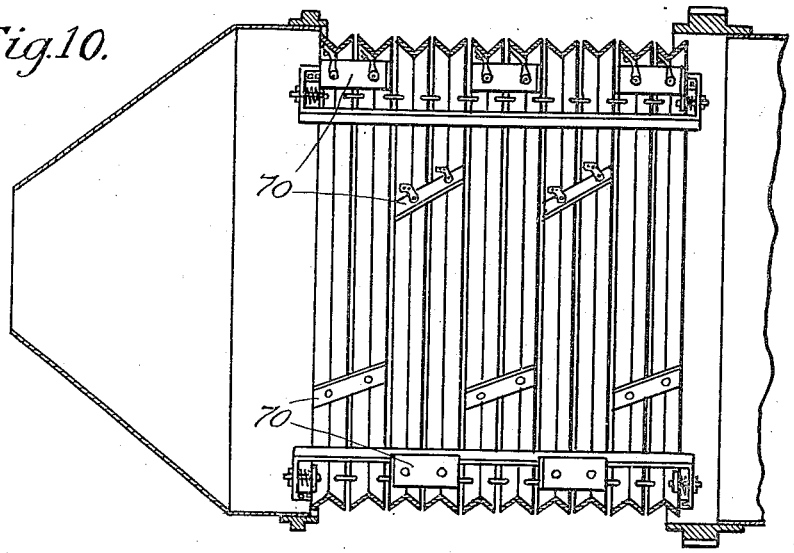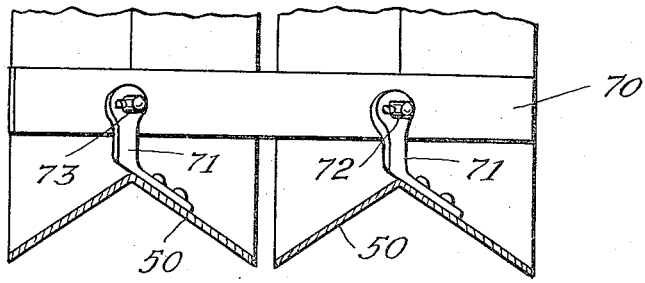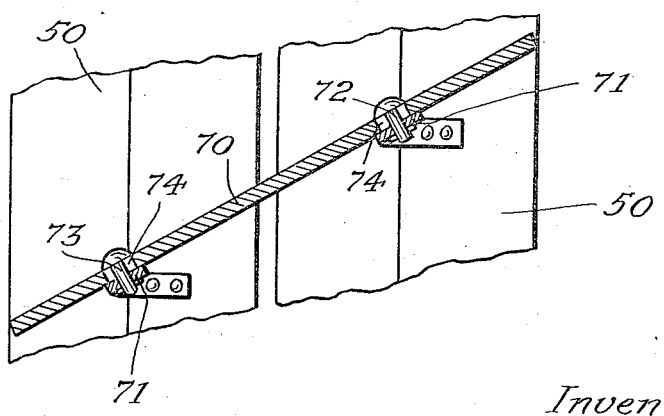

UNITED STATES PATENT OFFICE.

EDWARD J. VAUDREUIL, OF EAU CLAIRE, WISCONSIN.

MACHINE FOR PREPARING VEGETABLES.

1,304,719.    Specification of Letters Patent.    Patented May 27, 1919.

Application filed August 30, 1917. Serial No. 188,928.

*To all whom it may concern:*

Be it known that I, EDWARD J. VAUDREUIL, a citizen of the United States, residing at Eau Claire, in the county of Eau Claire and State of Wisconsin, have invented certain new and useful Improvements in Machines for Preparing Vegetables, of which the following is a specification.

My invention relates to machines for preparing vegetables, such as beans, for canning and has for its object to provide means for receiving beans in pods as they come from the field in a mixture of sizes, for discharging all of said beans excepting one size, for receiving and feeding such size of beans to a device for snipping the ends of beans, such as disclosed in my co-pending application Serial No. 154,104.

It is a particular object of my invention to form an assorting extension to the snipping drum of such application, which extension is driven by the same drive as that of the snipping drum, so that a batch of beans may be fed into the extension portion of the drum and as the same pass around all the beans will drop out of said extension excepting those of the proper size to be operated upon by the snipping drum which will be fed directly into the snipping drum and there be snipped and will be delivered in the assorted and snipped condition at the other end of the snipping drum.

It is a further object of my invention to provide a series of snipping drums, each designed to operate upon a certain size of beans and have in conjunction with each snipping drum an assorting drum of a size and character to discharge all the beans excepting those of a size to be operated upon in its snipping drum, the various snipping drums being adapted to operate upon successively smaller beans and its assorting drums being adapted to retain and deliver to its snipping drums beans of a size suitable for its snipping drum to operate upon. Means are provided for receiving the discharged beans from one assorting drum and delivering them successively to the next assorting drum so that the beans from the field are fed into the first assorting drum only and the several assortment of beans (usually in five different sizes) are separately and simultaneously discharged in properly snipped condition from the entire number of snipping drums in condition to be washed and canned.

The full objects and advantages of my invention will appear in connection with the detailed description thereof and are particularly pointed out in the claims.

Figure 4:
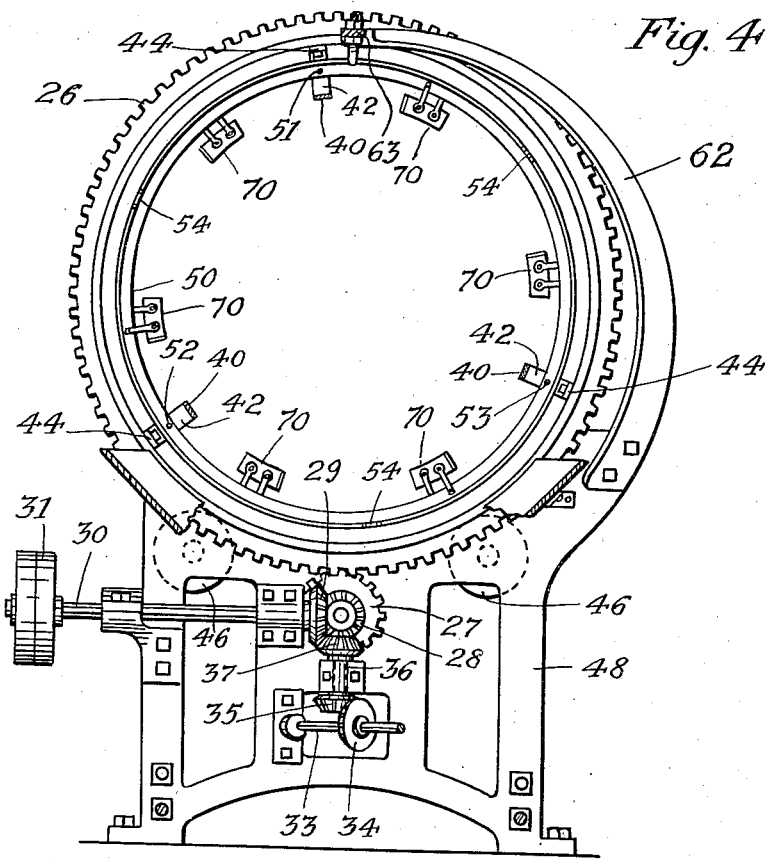
Figure 3:
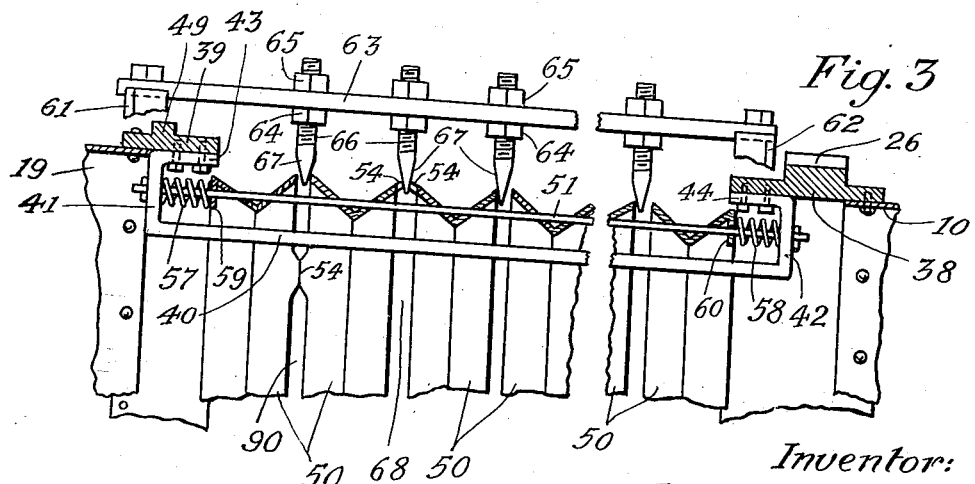

In the drawings, illustrating the application of my invention in one form,

Figure 1 is a plan view showing somewhat in diagram a complete machine for assorting and snipping and delivering in properly assorted and snipped condition beans which are fed in at one point only. Fig. 2 is a side elevation, on an enlarged scale, partly in section, of one of the assorting drums. Fig. 3 is a sectional view of the top of one of the assorting drums. Fig. 4 is a front elevation of the assorting drum. Figs. 5, 6, 7 and 8 are fragmentary views of means for holding the members of which the drums are composed, spaced apart. Figs. 9, 10 and 11 are detail part sectional views showing the manner of securing bean lifting flights to the interior of the sorting or grading drums.

As illustrated, a multiplicity of snipping drums 10, 11, 12, 13 and 14 are provided, in the instance shown there being five. These snipping drums are of the type described in the aforesaid co-pending application and need not be described in detail here. Connected to the ends of snipping drums 10, 11, 12 and 13 are assorting drums 15, 16, 17 and 18, each having a conical hopper end 19 and being exactly similar in construction excepting that the drums are progressively shorter and the spaces between the members forming the assorting portion proper grow progressively less from assorting drum 15 to assorting drum 18. The last snipping drum 14 does not have any assorting drum but has a conical extension 20 for receiving the beans. In each of the assorting drums 15 to 18 inclusive is a receiving hopper 21 which discharges into a carrier trough 22 in which runs an endless conveyer 23 whereby the beans from the hopper 21 are received and elevated to troughs 24 where they are discharged into the conical extension hoppers 19 of the several assorting drums 15, 16, 17 and 18, the last trough discharging into the receptacle hopper 20 of the final snipping drum 14. A delivery trough 25 receives and delivers the beans of the batch into the first assorting drum 15 and snipping drum 10, and from thereon the beans are assorted and snipped continuously and simultaneously without interference, the various assortment of snipped beans being delivered from the discharge ends of the snipping drums 10, 11, 12, 13 and 14 where they are received and cared for in any approved manner.

Each of the pairs of assorting and snipping drums 15, 10; 16, 11; 17, 12; and 18, 13 and the snipping drum 14 has thereon an annular gear 26 which is preferably positioned at the junction ends of the assorting and snipping drums, as shown in Fig. 2. This gear meshes with a pinion 27 driven by beveled gearing 28, 29 from a shaft 30 having thereon fast and loose pulleys 31 which are operated from a belt shaft above in a well known way. The endless carriers 23 run over rollers 32 on shafts 33 having thereon a beveled gear 34 driven by a beveled gear 35 on a short shaft 36 which has a beveled gear 37 thereon meshing with beveled gear 28. In this manner the several elevating carriers 23 are operated.

The assorting drum comprises a frame consisting of a ring 38 to which the annular gear 26 may be attached, or form a part, as shown in Fig. 3, and to which the snipping drum 10 may also be attached. A second ring 39 is held spaced from ring 38 by a plurality of bracer bars 40 which have right angled bends 41 and 42 at the ends thereof and inturned ends 43, 44 that are bolted to the inside of rings 38 and 39. The ring 39 is thus held rigidly connected with ring 38 and spaced therefrom a suitable distance. Pairs of rollers 45 and 46 mounted upon supporting frame members 47 and 48 engage the rings 38 and 39. A flange 49 on ring 39 and the gear member 26 on ring 38 prevent the inclined drums from moving forward as they roll upon the rollers 45 and 46. The receiving cone hopper 19 is secured to the ring 39.

The walls of the drum consist of a multiplicity of angular members 50 which may be formed of sheet metal or angle iron and which are V shaped in cross section. These members are strung upon a series of rods 51, 52 and 53 which are mounted in the end portion 41 and 42 of the bars 40 and which extend through both walls of angular members 50, as clearly indicated in Fig. 3, thus holding said members slidable on the rods and at the same time reinforcing the wall against being bent. The members 50 are thus strung with the upper portions turned inwardly. Upon the edges of the members 50 are formed lugs or projections. These lugs may be, as at 54 in Fig. 7, integrally formed of the metal of the angular members 50 or, as at 55 in Figs. 5 and 6, they may be of separate pieces of metal riveted to the members 50. In either event they will be beveled off, as indicated at 56, so as to give a cam edge for a purpose hereinafter to be explained. As clearly indicated in Fig. 2, the members 50 are so mounted in reference to the lug pieces 54 that the various lug pieces are in staggered relation running in substantially spiral lines about the drum formed by members 50. The members 50 strung on the rods 51, 52, and 53 are normally held with the lug pieces 54 in engagement by springs 57, 58 surrounding rods 51, 52 and 53 and which springs extending between the ends 41 and 42 respectively and lug pieces 59 and 60 turned down on said members 50. In this manner a complete drum is formed of members 50 which are yieldingly held in position so as to leave normal openings 90 between adjacent edges of said members and at the bottom of outwardly extending valleys formed by walls of V members with the V portion turned inwardly. These valleys are adapted to receive the beans and guide them to the openings 90 through which all smaller than a certain size will ultimately pass, dropping into the receiving hopper 21 and to the trough 22 from which they will be forwarded to the next assorting drum.

As the drum is rotated the beans which do not pass through will continually fall from the valleys as they approach the upper periphery of the drum. Some beans, however, may be of a size to partly pass through the openings 90 and yet not go clear through and thus tend to become caught and held in said openings. Means are provided to release such beans. Arms 61 and 62 are extended upwardly from frame members 47, 48 respectively so that the ends of said arms are positioned above the center of the drum and a bar 63 is supported by the arms 61 and 62 so as to extend in the vertical plane passing through the axis of the drum. Adjustably held upon the bar 63 by means of under and over nuts 64 and 65 are a multiplicity of threaded arms 66 having on the ends thereof V shaped fingers 67. These fingers are held by the bar to project into the slots or openings 90 between adjacent edges of members and engage the cam projections 54 from the edges of said members as the drum is rotated, thus momentarily and successively spreading the different adjacent members to increase the width of the opening 90, as indicated at 68 in Fig. 3. This will have the effect of releasing any beans which may be held in the opening 90. Because of the fact that the cam projections 54 are arranged so as to come in staggered relation throughout the length of the drum, only one pair of members will be spread at any one time. The spreading is against the force of springs 57 and 58 which permits the members to yield for the purpose. The arms, or pins, 66 may be projected a greater or less extent, as is desired, through the slot 90 and this, because of the wedge-shaped character of the fingers 67, will have the effect of increasing or decreasing the extent of the spreading effected by members 67.

For the purpose of lifting and turning the bean pods to permit them more readily to find the bottoms of the valleys and pass through the apertures if they are small enough, and also to aid it in forwarding the assortment to the snipping drum, I provide a multiplicity of flights 70 as shown in detail in Fig. 9. The flights are preferably short rectangular metal plates which are secured to brackets 71 carried upon the V's or apices of the members 50, the flights being supported by the brackets through bolts 72 and 73, which extend through slots 74 in the flight plates 70, thus permitting relative movement of the members 50 while at the same time holding the plates for flights 70 a sufficient distance from the members 50 to engage and lift the beans and to prevent clogging around the flights. As clearly shown in Figs. 4 and 9, the flights are extended obliquely with reference to the axis of the sorting drum and are placed in alternately offset relation. This results in not only lifting the beans, but in causing them to be much turned and also in forwarding them toward the delivery end of the grading drum, from which said beans are fed into the snipping drum.

The advantages of my invention will be apparent. It provides a complete bean assorting and snipping apparatus so that the beans as they come from the field will only need to be delivered to the first assorting drum and will be progressively assorted and fed to the snipping drum. Assorting drums embodying the principles of my invention have very great capacity, so that beans may be fed in sufficient quantity to the initial drum to provide a sufficient assortment for each of the snipping drums to work the snipping drums to maximum capacity and at the same time providing thoroughly efficient assorting. A large amount of labor in the handling of beans is dispensed with, and more than that, the beans are prepared for canning with relative great speed, thus preventing their getting old, or wilting, as frequently happens where hand preparation is depended upon, particularly during the rush season and when labor may be difficult to obtain. The construction of the assorting drums is such that they may be made of any desired length by simply increasing the length of the frame members 40 and rods 51 and adding more of the V-shaped angular members 50. The intermittent spreading of the adjacent pairs of members at the upper portion of their travel on the drum has the effect of instantly releasing all beans which may be held in the valleys between adjacent members and increases not only the capacity but the accuracy of the assorting mechanism.

I claim:

1. An apparatus for operating upon vegetables such as beans comprising a moving receptacle formed of a multiplicity of relatively-movable members held in one position of the receptacle with their adjacent edges in predetermined spaced relation to form supports and grading openings for the vegetables, and means for periodically increasing the degree of separation of said members at a point in the receptacle where the members have no supporting or bean-grading function.

2. An apparatus for operating upon vegetables such as beans comprising an assorting drum formed by a multiplicity of annular members, means for holding said members with adjacent edges thereof separated a given distance, means for rotating the drum, and means for periodically separating the members.

3. An apparatus for operating upon vegetables such as beans comprising an assorting drum formed by a multiplicity of annular members, means for holding said members with adjacent edges thereof separated a given distance, means for rotating the drum, and means for periodically separating the members, said means being operative continuously to separate the members at the upper periphery during their movement to release beans held and caught thereby.

4. A device for sorting beans comprising a frame, a multiplicity of members movably held upon said frame so as to form the walls of an assorting receptacle, means for yieldingly holding said members with portions of their edges in engagement so that adjacent cutaway portions thereof form discharge slits or openings, and means acting on said members periodically to spread them further and cause them to release the beans held thereby.

5. An apparatus for operating upon vegetables such as beans comprising an assorting drum having the walls thereof formed of a multiplicity of annular sheet metal members of V-shaped cross section, said members being strung upon a framework embodying a plurality of rods extending through the body of the members and holding the edges thereof in alinement, and means extended from said edges for holding the members spaced at their edges to permit discharge of beans small enough to pass through said spaces.

6. A device for assorting vegetables such as beans, comprising a supporting member formed of a multiplicity of annular members each of V-shaped cross-section, with the closed V thereof turned toward the material to be operated upon, and means for holding said members assembled and relatively movable with their edges spaced apart so as to leave extensible openings along the bottoms of valleys formed between adjacent members.

7. An apparatus for operating upon vegetables such as beans comprising an assorting drum having a multiplicity of annular members each of V-shaped cross-section with the V thereof turned inwardly, means for holding said members assembled with their edges spaced apart so as to leave annular openings along the bottoms of valleys formed between adjacent members, and means for periodically separating said members at the top of the drum to release any held beans.

8. An apparatus for operating upon vegetables such as beans comprising a frame having a multiplicity of longitudinal rods, a multiplicity of annular members of V-shaped cross-section strung upon said rods with the V portions turned inwardly, means extending from the edges of said members to prevent said edges from contacting, and means for holding the members so said last-named means are caused to engage, leaving gaps between adjacent edges of the members.

9. An apparatus for operating upon vegetables such as beans comprising a frame having a multiplicity of longitudinal rods, a multiplicity of annular members strung on said rods and relatively movable thereon, and means for holding the adjacent edges of said members separated to admit passage of beans.

10. An apparatus for operating upon vegetables such as beans comprising a frame having a multiplicity of longitudinal rods, a multiplicity of annular members each of V-shaped cross-section with the V thereof turned inwardly strung upon said rods, all of said rods passing through both walls of said members, and means for holding said members with their edges spaced apart so as to leave annular openings along the bottoms of valleys formed between adjacent members.

11. An apparatus for operating upon vegetables such as beans comprising a frame having a multiplicity of longitudinal rods, a multiplicity of annular members each of V-shaped cross-section with the V thereof turned inwardly strung upon said rods, all of said rods passing through both walls of said members, and springs on said rods engaging the outer of said members and holding all of said members yieldingly in position.

12. An apparatus for operating upon vegetables such as beans comprising a frame having a multiplicity of longitudinal rods, a multiplicity of annular members each of V-shaped cross-section with the V thereof turned inwardly strung upon said rods, all of said rods passing through both walls of said members, springs on said rods engaging the outer of said members and holding all of said members yieldingly in position, and means for periodically causing the members to be separated at their upper peripheries during rotation.

13. An apparatus for operating upon vegetables such as beans comprising a frame having a multiplicity of longitudinal rods, a multiplicity of annular members strung on said rods and relatively movable thereon, lugs extending outwardly from the edges of said members, and means for holding said lugs in engagement whereby the members are held separated to admit passage of beans between the same.

14. An apparatus for operating upon vegetables such as beans comprising a frame having a multiplicity of longitudinal rods, a multiplicity of annular members strung on said rods, lugs extending outwardly from the edges of said members, and springs for yieldingly holding all adjacent sets of lugs in engagement to leave annular openings between the same.

15. An apparatus for operating upon vegetables such as beans comprising a frame having a multiplicity of longitudinal rods, a multiplicity of annular members strung on said rods, lugs extending outwardly from the edges of said members, springs for yieldingly holding all adjacent sets of lugs in engagement to leave annular openings between the same, and means engageable with said lugs as the drum is rotated for intermittently spreading adjacent members to permit held beans to be dropped.

16. An apparatus for operating upon vegetables such as beans comprising a frame having a multiplicity of longitudinal rods, a multiplicity of annular members strung on said rods, lugs on said members for holding the adjacent edges spaced, springs on the rods yieldingly holding the lugs in contact, and fingers extending between the members and adapted to engage the lugs as the drum is rotated for intermittently spreading adjacent members to permit held beans to be dropped.

17. An apparatus for operating upon vegetables such as beans comprising a frame having a multiplicity of longitudinal rods, a multiplicity of annular members strung on said rods, lugs formed on said annular members for holding the same spaced to permit passage of some of the beans, said lugs being formed in spirally-staggered relation upon the successive pairs of members, springs on the rods continuously holding all adjacent pairs of lugs in contact, and fingers extending between the members and adapted successively to engage the lugs of different pairs of members for spreading the same to permit dropping of held beans.

18. An apparatus for operating upon vegetables such as beans comprising a sorting drum having a multiplicity of annular members, means for holding said members with adjacent edges thereof separated a given distance, means other than the members within the drum for engaging the beans and lifting and turning them, and means for rotating the drum.

19. An apparatus for operating upon vegetables such as beans comprising a sorting drum having a multiplicity of annular members, means for holding said members with adjacent edges thereof separated a given distance, means for periodically separating the members an additional distance as the drum is rotated, and means within the drum other than said members for engaging the beans and lifting and turning the same.

20. An apparatus for operating upon vegetables such as beans comprising a sorting drum having a multiplicity of annular members, means for holding said members with adjacent edges thereof separated a given distance, means for periodically separating the members an additional distance as the drum is rotated, and means connected with said members so that the members may move relatively thereto for such last-named separation for lifting and turning the beans, and means for rotating the drum.

21. An apparatus for operating upon vegetables such as beans comprising a plurality of annular members, means for holding said members with adjacent edges thereof separated a given distance, means for rotating the drum, and a multiplicity of short plates supported by the members and extended inwardly within the drum for engaging and turning the beans as the drum is rotated.

22. An apparatus for operating upon vegetables such as beans comprising a plurality of annular members, means for holding said members with adjacent edges thereof separated a given distance, means for rotating the drum, and a multiplicity of short plates supported by the members and extended inwardly within the drum for engaging and turning the beans as the drum is rotated, said plates being extended obliquely with reference to the axis of the drum for assisting and forwarding the drum toward the discharge end of the drum.

23. An apparatus for operating upon vegetables such as beans, comprising a receptacle having vegetable supporting portions formed of a multiplicity of relatively movable members with their adjacent edges normally held in predetermined spaced relation, means for inverting said supporting portions, and means for increasing the degree of separation thereof while they are inverted.

In testimony whereof I affix my signature.

EDWARD J. VAUDREUIL.